Dec. 21, 1965   JOHN R. OISHEI ETAL   3,224,027
WINDSHIELD WIPER BLADE
Filed Oct. 3, 1962                          2 Sheets-Sheet 1

INVENTOR.
JOHN R. OISHEI and
ANTHONY C. SCINTA.
BY E. Herbert Liss
ATTORNEY.

Dec. 21, 1965  JOHN R. OISHEI ETAL  3,224,027
WINDSHIELD WIPER BLADE
Filed Oct. 3, 1962  2 Sheets-Sheet 2

INVENTOR.
JOHN R. OISHEI and
BY ANTHONY C. SCINTA
E. Herbert Liss
ATTORNEY.

United States Patent Office 3,224,027
Patented Dec. 21, 1965

3,224,027
WINDSHIELD WIPER BLADE
John R. Oishei, Buffalo, and Anthony C. Scinta, Hamburg, N.Y., assignors to Trico Products Corporation, Buffalo, N.Y.
Filed Oct. 3, 1962, Ser. No. 228,108
5 Claims. (Cl. 15—250.41)

The present invention relates to windshield cleaning apparatus and, more particularly, to windshield wiper blade units for motor vehicles.

Windshield wiper blades for motor vehicles are subjected to exposure to sun aging and ozone penetration, particularly on the side of the blade which is exposed in the normal parked position. These and other weathering factors have a deteriorating effect on rubber or rubber-like materials which are utilized in wiper blades. This deterioration reduces the life of the blade and impairs the effectiveness of the wiping edge. The life expectancy of a blade for automotive vehicles can be considerably increased by avoiding this exposure. Avoidance of this exposure can be accomplished by providing twin longitudinal lips. In this manner the inner wiping edges of the wiping lips will be protected from the above-mentioned weathering influences. In a twin-lipped blade, final wiping in both directions will always be performed by the interior protected surface of the blade lip.

The manufacturing of prior art twin-lipped blades is difficult and expensive. To obtain proper dimensions and tolerances, complex trimming and machining operations are required. Presently known twin-lipped blades also require costly molding processes.

In addition to the aging problem inherent in conventional windshield wipers, lifting of the blade off of the windshield at high vehicle speeds and high wind velocity results in improper wiping. This is often referred to as wind lift. Wind lift occurs because of the movement and high wind velocity of the air at high speed relative to the approaching windshield. This tends to raise the wiping lip from the windshield. Once a portion of the wiping lip is broken away from the surface of the windshield, the blade under adverse wind conditions may then be lifted completely off the windshield, rendering the wiper ineffective to provide adequate vision for the driver when precipitation is falling. The unique twin longitudinal lipped wiper constructed in accordance with the invention to be hereinafter described relieves this problem.

A number of factors are involved in overcoming wind lift, one of which is proper blade pressure. Pressure sufficient to avoid wind lift may be excessive under low speed driving conditions where wind lift is not present. Excessive pressure results in chattering and depositing of rubber on the windshield which shortens blade life and obscures vision. Thus an apparent paradox exists in that pressure sufficient to avoid wind lift will become excessive when conditions causing wind lift do not occur and proper pressure under normal conditions will result in a poor wipe at high vehicle speeds and high wind velocity. Thus the wind lift problem must be solved by means other than merely increasing pressure on the blade. By use of the twin-lipped blade, arm pressure applied to the wiper arm is divided between the wiping lips. Thus increased overall pressure can be applied to the arm of a twin-lipped blade to combat wind lift and yet avoid the objectionable problems which increased pressure introduces on single lip blades.

By the unique double-ply construction of the blade of this invention, lighter pressure is applied to the leading lip and heavier pressure to the trailing lip. This results in an improved wipe over present twin-lipped blades since the leading lip provides a preliminary wipe while the trailing lip provides the final wipe.

The principal object of the present invention is to provide an improved double-ply, twin-lipped wiper blade construction in which the trailing lip has greater resistance to wind lift than the leading lip.

Another object of the present invention is to provide an improved wiper blade of double-ply construction which permits utilization of a lower blade silhouette tending to quiet the reversal sound by lessening the distance of the drop as the blade assembly is canted into its angular attitudes of wiping.

Another object of the present invention is to provide an improved twin-lipped wiper blade which is economical and results in a blade having increased effectiveness and resistance to wind lift.

A further object of the invention is to provide an improved wiper blade assembly utilizing a pair of separable blade body portions which enable simplified manufacturing of the blade and result in the separable body portions acting on each other to provide improved pressure distribution.

A still further object of the invention is to provide an improved wiper blade assembly in which the blade element acts to reinforce the backing strip under adverse operating conditions.

Other objects and advantages of the invention will be apparent from the following detailed description taken in connection with the accompanying drawings in which.

Figure 1:
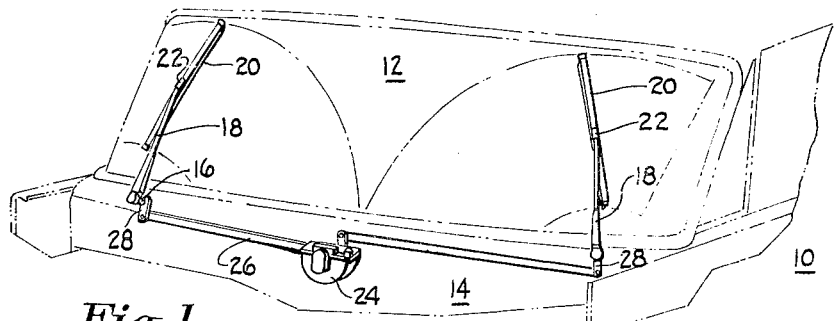
FIG. 1 is a fragmentary perspective view of an automotive vehicle mounting a windshield wiper blade made in accordance with the present invention.

In FIG. 1 an automotive vehicle 10 is shown having a windshield 12 thereon. Suitably journaled in the cowl 14 of the vehicle are rockshafts 16 which mount wiper arms 18 which, in turn, carry wiper blades 20 by means of clips 22. A windshield wiper motor 24 is suitably mounted on the cowl or fire wall 14 of the vehicle 10 and is adapted to drive linkage 26 which, in turn, drives crankarms 28 which are mounted on rockshafts 16. The foregoing operation of a motor vehicle windshield wiper is well understood in the art.

The improved wiper blade of the present invention includes a superstructure 30 of any of a number of well known types of superstructures for securing a wiper blade to a wiper arm 18 and for distributing pressure along the wiper blade. An example of the type of superstructure employed with the blade unit of this invention is more fully shown and described in Patent No. 2,834,976 issued May 20, 1958, by J. R. Oishei and assigned to Trico Products Corporation. It includes generally a pressure distributing linkage assembly having a plurality of levers, one of which is shown at 34, having claws 36 for engaging a backing strip 38. The blade unit comprises a squeegee or blade 40 supported by the surface conforming backing strip 38 to which the arm pressure is distributed through the superstructure 30.

One embodiment of the squeegee unit 40 of this invention comprises a pair of identical squeegee unit sections 40a and 40b which form the squeegee unit 40. The squeegee unit sections 40a and 40b may be of rubber or other like elastomeric materials having suitable flexibility and resiliency. Since the squeegee unit sections 40a and 40b are identical, for the purpose of brevity, only section 40a will be described. The reference numerals in the drawings for unit 40a will be suffixed with "a." Identical parts in section 40b will be identified by identical numerals suffixed by "b." Squeegee unit section 40a comprises an elongated anchoring portion 42a secured to an enlarged body head portion 44a by a neck portion 46a which forms a recess 48a intermediate the anchoring portion 42a and the enlarged head portion 44a. Secured to the enlarged head portion 44a is a body portion 50a having a lip portion 52a on its longitudinal edge remote from the head portion 44a. The body portion 50a is disposed centrally along the longitudinal edge of the enlarged head portion 44a. The enlarged head portion 44a overhangs the body portion 50a and the anchoring portion 42a on each thereof to form flex limiting shoulders and to space the body portions 50a and 50b from each other. The body portion 50a tapers on each side from a wide base portion at its junction with the enlarged head portion 44a to a narrow portion at its junction with the lip portion 52a. A smooth uninterrupted side surface 54a is formed by one side of the anchoring portion 42a, the neck portion 46a and the enlarged head portion 44a. This side surface 54a is displaced laterally from the body portion 50a. The smooth uninterrupted side surfaces 54 of each of the squeegee sections 40a and 40b are disposed in juxtaposition abutting each other to form a squeegee unit having a pair of laterally spaced elongated wiper lips 52 resulting in a double-ply twin-lipped squeegee unit.

Although the sections 40a and 40b are shown as being completely separable, it will of course be understood that in accordance with the broader aspects of this invention, the anchoring portions of each section may be rigidly secured together so that the blade is separable intermediate the wiping lips 52 at least for the distance between the lower surface of the enlarged head portions 44 which are adjacent the body portions 50 to the lower surface of the anchoring portions 42 which are adjacent the neck portions 46.

Figure 5:
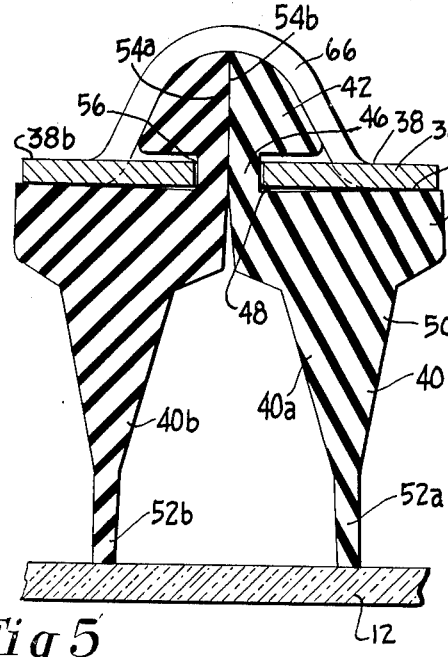
FIG. 5 is a greatly enlarged cross-sectional view of a wiper blade of this invention in its position just prior to reversal.

The squeegee sections 40a and 40b are held together by the backing strip 38. The backing strip 38 comprises a flat flexible elongated strip of steel or other suitable material, having a central elongated slot 56 extending longitudinally of the backing strip 38 dividing the backing strip into two elongated sections 38a and 38b connected together. The backing strip 38 has a thickness from its upper surface 58 to its lower surface 60, as seen in FIG. 5, which is smaller than its width from its side edge 62 to its side edge 64. The width of the slot is substantially equal to the sum of the widths of the neck portions 46 of sections 40a and 40b, but wide enough to provide slight clearance for freedom of movement and assembly purposes. With the sections 40a and 40b disposed with their side portions 64 in juxtaposition, the neck portions 46 are received in the central slot 56 of the backing strip 38. A connecting portion 65 forming the ends of the slot 56 is provided at each end of the backing strip 38 and is pressed downwardly into substantial U-shape. These end portions 65 retain the squeegee unit 40 against longitudinal movement relative to the backing strip. Inverted, substantially U-shaped cross braces 66 are provided at longitudinally spaced positions along the backing strip and have their free end secured to opposite sides of the slot 56 to provide reinforcement against lateral movement of the backing strip sections 38a and 38b.

Figures 7, 8:
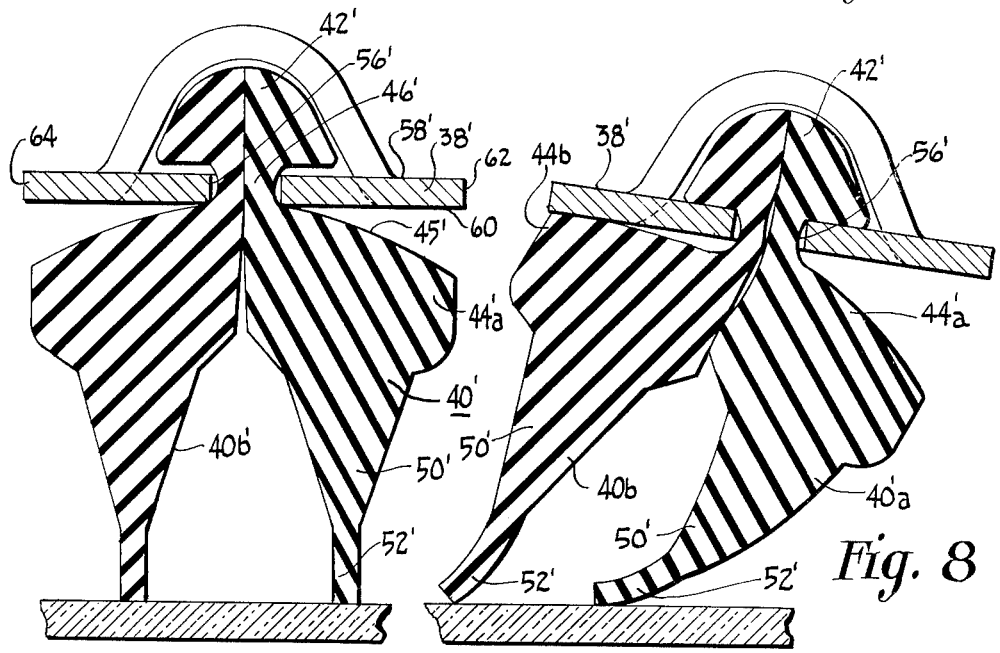
FIG. 7 is a view of another modification of this invention similar to FIG. 5.
FIG. 8 is a cross-sectional view of the modification shown in FIG. 7 similar to the view shown in FIG. 6.

Shown in FIGS. 7 and 8 is another embodiment of the wiper blade unit. In this embodiment, an identical backing strip 38' is employed, the difference being only in the squeegee unit 40'. In this embodiment, each section 40'a and 40'b includes a wiping lip 52' along one longitudinal edge of the body portion 50' and an enlarged head portion 44' along the other longitudinal edge of the body portion 50'. The enlarged head portion is connected at its other edge through a neck portion 46' to an anchoring portion 42'. In the embodiment of FIGS. 7 and 8, the enlarged head portion 44' of each of the sections 40'a and 40'b have an arcuate upper surface 45' adjacent the lower surface 60' of the backing strip. The arcuate surface is arranged to tangentially engage the backing strip adjacent the slot 56' at the central portion of the assembled unit 40' comprising sections 40'a and 40'b adjacent the neck portions 46' thereof.

Figure 6:
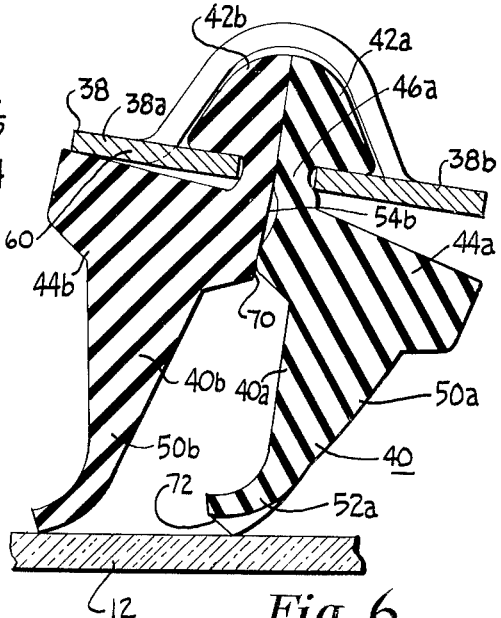
FIG. 6 is a greatly enlarged cross-sectional view of the wiper blade modification shown in FIG. 5 which is moving to the right as seen in the illustration.

The operation of the FIG. 5 modification is as follows:

When in the position shown in FIG. 5, which is the neutral position the blade assumes when it has reached the end of a stroke just prior to reversal, the backing strip 38 engages the upper surface or shoulder 45 of the head portion 44 for a relatively short distance adjacent the outer edges. As seen in FIG. 6, the blade is moving to the right against a relatively high wind velocity. As the leading lip 52a starts to reverse, the neck portion 46a of the leading section 40a distorts, as seen in FIG. 6, and the enlarged head portion 44a engages the side surface 54b, as at 70, forming a pivot point for the head portion 44a of the leading section. Continued movement of the head portion 44a results in increased force applied by the head portion 44b against the adjacent surface of the backing strip 38. While this is occurring, the anchoring portion 42 is pulled down into contact with the upper surface of the backing strip 38 adjacent the slot 56. It should be noted that the backing strip 38 assumes a canted position as the blade moves across the windshield thereby resulting in flexing of the backing strip in a multiplicity of planes in order to conform to the curved surface being wiped. This can be clearly seen in FIG. 6. The enlarged head portion 44a of the leading section 40a recedes away from the lower surface of the backing strip 38, forming an acute angle therewith, as can be seen clearly in FIG. 6. This section reinforces the section 38b of the backing strip 38 adjacent the trailing squeegee unit section 40b and increases the pressure on the trailing portion. Now assuming a high wind velocity in the direction opposed to the direction of motion of the blade, a portion of the leading lip 52a may be lifted off the windshield, as seen at 72 in FIG. 6. Under these conditions, the air blast passing through the leading lip 52a into the space 72 is now weakened and, at the same time, increased pressure from the reinforced backing strip is being applied to the trailing lip 52b. As the weakened air blast strikes the trailing lip 52b and forces it outward, the entire blade has a tendency to move downward. Furthermore, the air following in the space between the leading side of the backing strip 38 and the upper surface of the enlarged head portion 44a has a component in the direction of the windshield which tends to further hold the blade against the windshield. Thus the trailing lip 52b is relieved of any wind lift tendency by a combination of increased support for the backing strip, a weakened air blast having lost much of its pressure in opening the leading lip 52a and a component of the air blast intermediate the upper surface of the leading enlarged head portion 44a at the leading side of the backing strip 38a tending to drive the blade toward the windshield.

It should be here noted that in operation the tendency for the backing strip 38' in the modification shown in FIG. 7 to be reinforced by the action of the blade is substantially more pronounced. In this modification, in its neutral position prior to reversal, the backing strip 38' is resting on the central portion of the arcuate upper surface 45' of the head portion 44' adjacent to the neck portions 46′ and the anchoring portion 42′ is spaced from the upper surface of the backing strip 38′. As the blade moves to the right, it assumes the position shown in FIG. 8. In this modification, there is a rolling effect between the round or arcuate shouldered head portion 45′ and the bottom side of the backing strip 38′ on the trailing half of the wiper rubber. As the roll starts, it causes the lower surface of the anchoring portion 42′ to engage the top of the backing strip 38′ and the rolling effect causes the trailing section of backing strip 38′ to be pinched between the trailing arcuate upper surface or shoulder 45′ and the trailing anchoring portion 42′, thus causing the backing strip 38′ to become less flexible and thereby reducing the tendency of the backing strip 38′ to bow upward away from the windshield between the pressure points of the superstructure. Here, again, as seen in FIG. 8, the backing strip 38′ assumes a canted position. This action increases resistance to wind lifting at high rates of vehicle speed and wind velocity. In addition, the FIG. 7 modification, due to the twin-lipped double-ply structure, has the same advantages as the FIG. 5 modification in that the wind velocity is greatly reduced in the process of lifting the lip 52′ of the leading section and further has a component in a direction toward the windshield between the lower portion 60 on the leading side of the backing strip and the upper surface 45′ on the leading section of the enlarged head portion 44′.

Because of the double-ply structure employed in both illustrated modifications of this blade, the neck portion of each ply or section is of smaller width and, therefore, much more flexible. Therefore, a smaller turning couple is required to achieve the proper angular attitude of the wiping lip. This permits the blade to be of a lower silhouette. The lower silhouette reduces the distance of the drop as the blade is canted from one angular position to the opposite angular position while flexing to conform to the surface being wiped, and thus tends to quiet the reversal sound. Besides achieving a quieter operation, the lower silhouette results in less obstruction and distraction to the operator. Further quieting is achieved in the modification shown in FIG. 7 because of the rolling action between the shoulder 45′ and the lower surface of the backing strip 38′.

Because the dimensions of a resilient squeegee unit and tolerances are quite important in providing an effective and efficient wipe, a suitable method of manufacturing to provide close tolerances on dimensions of the rubber element is important and presents a problem in the prior art twin-lipped windshield wiper blades. These are generally of one piece molded material. It is quite difficult to maintain the tolerances required without extensive machining and trimming.

Figure 2:
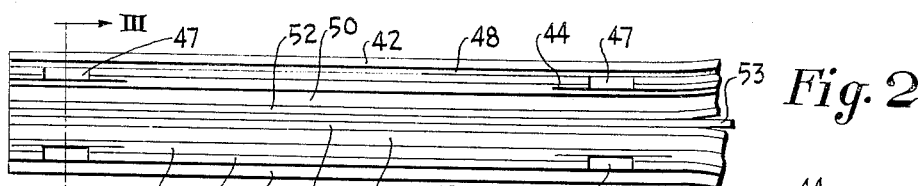
FIG. 2 is an elevational view of the molded rubber utilized in manufacturing the wiper blade of this invention.
Figure 3:
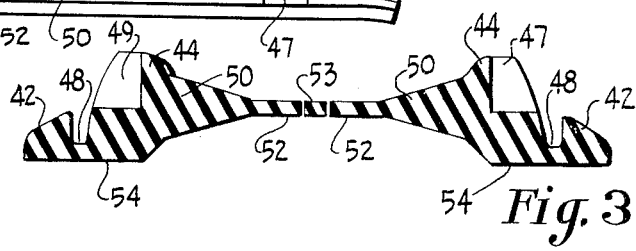
FIG. 3 is a cross-sectional view taken on line III—III of FIG. 2 showing the molded rubber utilized in the blade of this invention.
Figure 4:
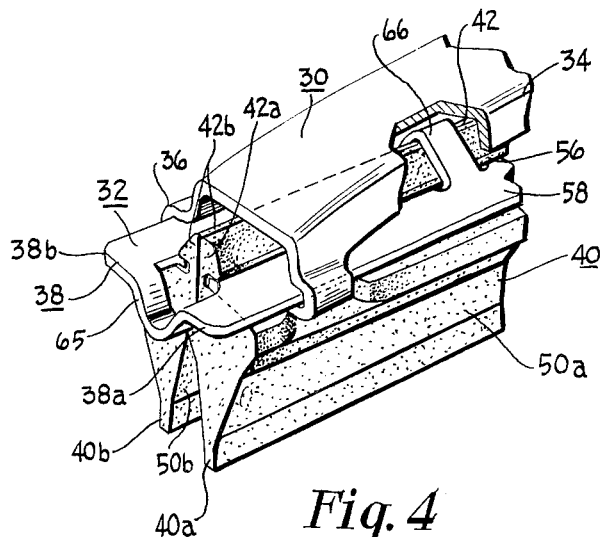
FIG. 4 is an enlarged fragmentary perspective view of the wiper blade assembly of this invention.

FIGS. 2 and 3 illustrate the molded rubber of the blade of this invention as it appears subsequent to molding and prior to cutting and assembly. The rubber may be molded, or in accordance with the broad aspects of this invention, formed in any suitable manner, in a single strip which includes the shaped anchoring portions 42 extending longitudinally along each side edge of the strip including a slot recess 48 inwardly adjacent to each of the anchoring strips and the enlarged head portions 44 inwardly of the recess. The center portion of the molded rubber includes a portion of constant thickness wide enough to provide for two wiping lips 52 and excess trim material 53 centrally of the portion of constant thickness. Each of the enlarged head portions are molded to form tapered body portions 50 on each side thereof. Notches 47 are provided at a plurality of longitudinally spaced points on each of the enlarged head portions 44 to provide space for the claws or harness connectors 36. The molded strip is then cut along two transversely spaced longitudinal lines to provide a lip of the desired length and to provide a lip edge of the desired shape which is shown herein as having square corners and a flat edge. The strip 53 intermediate the longitudinal cutting lines may then be discarded. The sections 40 may then be placed side by side with the smooth surfaces 54 disposed in abutment and thereafter the anchoring portions 42 may be inserted in the central slot 56 of the backing strip 38. The molded strip may be of sufficient length to form a plurality of squeegee units and may be cut along longitudinally spaced transverse lines, each of these cuts defining the end of a squeegee unit.

It is also possible to mold the strips of a shape having an anchoring head at one longitudinal edge, the slot 48 extending longitudinally adjacent to the anchoring portion, the head portion adjacent thereto, followed by the tapered body portion 50 and ending with the constant width lip portion 52 having a slight width of excess material along the longitudinal edge to provide for cutting of the lip portion to the required length and shape. In this mode of manufacture, the molded strip would be cut on transverse lines, longitudinally spaced, defining squeegee unit sections, any two of which of the same length could be placed with their smooth surfaces 54 in abutting relation and thereafter inserting the anchoring portions 42 in the slot 56 of backing strip 38.

A method has been described and a modification thereof which provides an economical means for manufacturing a squeegee unit for a windshield wiper which can be held to extremely close tolerances and which results in a blade that provides improved and more effective wiping and which reduces the tendency of the blade to be lifted off the windshield when the car is traveling at high speeds against a strong wind.

Here has been shown and described an improved windshield wiper blade assembly and method of manufacturing that not only protects the inner wiping edge of the wiping lip against sun aging and deterioration from ozone penetration, but also serves to divide the pressure between a pair of wiping lips so that increased pressure may be applied to the wiper blade arm without causing ill effects. This unique squeegee unit is so constructed, as hereinabove described, as to distribute the greater portion of the pressure to the trailing lip of a pair of twin lips under adverse speed and wind conditions which tend to lift the blade off the windshield. This results in a more effective wipe since the trailing lip performs the final wiping operation. The unique construction of this blade permits it to be so manufactured that a twin-lipped blade can be made with extremely close tolerances in an economical manner, eliminating waste and avoiding complex molding, machining and difficult trimming operations inherent in prior art twin-lipped blades.

It should now be apparent that an improved wiper blade and method of manufacturing thereof has been provided. Certain specific embodiments of the invention have been described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A squeegee unit for windshield wipers comprising an elongate anchoring portion, an elongate enlarged head portion having an arcuate upper surface adjacent said anchoring portion, a reduced neck portion securing said enlarged head portion to said anchoring portion, laterally spaced elongate wiping lips depending from said enlarged head portion, said squeegee unit having sections separable in a longitudinal plane passing through a line intermediate said wiping lips and extending from the lower surface of said enlarged head portion upwardly to at least the lower surface of said anchoring portion.

2. A windshield wiper squeegee unit comprising a pair of elongate flexible squeegee sections, each of said sections comprising a body portion having an anchoring portion along one longitudinal edge, a wiping lip along the opposite longitudinal edge and a neck portion flexibly connecting said anchoring portion to said body portion, each of said anchoring, neck and body portions including an uninterrupted side surface laterally displaced from the side surface of said lip portion, said side surfaces of one of said sections being disposed in juxtaposition with the corresponding side surface of the other of said sections to form a squeegee unit having a pair of laterally spaced elongated wiping lips.

3. A windshield wiper squeegee unit comprising a pair of substantially identical flexible squeegee sections, each of said sections comprising an elongate body portion having an anchoring portion secured thereto along one longitudinal edge and a wiping lip secured thereto along the opposite longitudinal edge, said body portion including an enlarged head portion adjacent said anchoring portion forming a shoulder, said shoulder and said anchoring portion having an uninterrupted side surface laterally displaced from the side surface of said lip portion, said side surface of one section being disposed in abutment with the corresponding side surface of the other of said sections to form a squeegee unit having a pair of laterally spaced elongated wiping lips.

4. A wiper blade for use in a vehicle windshield wiper comprising a squeegee unit having an elongate anchoring portion, an elongate enlarged head portion secured to said anchoring portion forming an upwardly facing shoulder adjacent said anchoring portion and a backing strip having a width greater than its thickness secured to said anchoring portion and disposed intermediate said anchoring portion and said enlarged head portion overlying said upwardly facing shoulder, a pair of laterally spaced elongated wiping lips depending from said enlarged head portion, said squeegee unit having a pair of sections separable along a longitudinal plane intermediate said wiping lips extending from the lower surface of said enlarged head portion upwardly to at least the upper surface of said backing strip.

5. A wiper blade for use in a vehicle windshield comprising a squeegee unit having an elongate anchoring portion, an elongate enlarged head portion, a reduced elongate neck portion intermediate said enlarged head portion and said anchoring portion, said elongate enlarged head portion having an upper arcuate surface facing the lower surface of said anchoring portion forming a pair of arcuate shoulders extending laterally outward from the sides of said anchoring portion, a longitudinally slotted backing strip having a width greater than its thickness, said backing strip disposed intermediate said anchoring portion and said enlarged head portion and having its slot straddling said neck portion and having a central portion of its lower surface engaging a central portion of said arcuate surface of said enlarged head portion from substantially end to end of said enlarged head portion, said enlarged head portion having a pair of transversely spaced wiping lips depending therefrom and said squeegee unit including separable sections separable in a longitudinal plane through a line intermediate said wiping lips extending upwardly from the lower surface of said enlarged head portion to at least the upper surface of said backing strip.

References Cited by the Examiner
UNITED STATES PATENTS

| | | | |
|---|---|---|---|
| 1,771,824 | 7/1930 | Storrie | 15—250.41 X |
| 1,989,296 | 1/1935 | Smulski | 15—250.42 |
| 2,697,241 | 12/1954 | Oishei | 15—250.42 |
| 3,037,233 | 6/1962 | Peras et al. | 15—250.42 |
| 3,056,991 | 10/1962 | Smithers | 15—250.42 |
| 3,116,507 | 1/1964 | Scinta | 15—250.42 |

WALTER A. SCHEEL, *Primary Examiner.*
CHARLES A. WILLMUTH, *Examiner.*